April 10, 1945. L. R. ST. ONGE 2,373,333
METHOD AND APPARATUS FOR SIMULATING HIGH ALTITUDE CLIMB CONDITIONS
Filed July 11, 1942 3 Sheets-Sheet 2

Inventor
Lucien R. St. Onge
By
Dodge and Ons
Attorneys

April 10, 1945.   L. R. ST. ONGE   2,373,333
METHOD AND APPARATUS FOR SIMULATING HIGH ALTITUDE CLIMB CONDITIONS
Filed July 11, 1942   3 Sheets-Sheet 3

Inventor
Lucien R. St.Onge
By
Dodge and Ihm
Attorneys

Patented Apr. 10, 1945

2,373,333

UNITED STATES PATENT OFFICE 2,373,333

METHOD AND APPARATUS FOR SIMULATING HIGH ALTITUDE CLIMB CONDITIONS

Lucien R. St. Onge, Brookline, Pa., assignor to York Corporation, a corporation of Delaware Application July 11, 1942, Serial No. 450,582

21 Claims. (Cl. 257—9)

This invention relates generally to refrigeration and particularly to a method and means for simulating the conditions encountered in rapid climbs to high altitudes, while permitting observation of persons subject to such changing conditions.

A modern military plane is capable of flying from sea level to altitudes of 40,000 feet in periods of from 10 to 12 minutes, and because a sealed fuselage is impracticable, the crew are subjected to extreme and rapid reductions of temperature and atmospheric pressure. Even with heated suits and oxygen masks, the physiological reactions are severe, and incapacitate some men. The method and apparatus here disclosed are used to study physiological reactions generally, to test the reaction of particular men, and to condition crews for high altitude flights.

At 40,000 feet the temperature is of the order of 67° below zero F. and the barometer is at about 5.54 inches of mercury. Using a sealed "climb chamber" for the subjects, it is comparatively a a simple matter to reduce pressure in the chamber at the necessary rate to simulate climb pressure conditions, but attainment of the cooling rate requires such rapid abstraction of heat that any refrigerative plant of the necessary capacity would be prohibitively large. The problem was to spread the refrigerative load and still attain the necessary rapid temperature change when it is required.

Recourse is had to a climb chamber and some means to chill it and its constituent parts by a long continued refrigerating operation to a temperature lower than —67° F., say —100° F. So far as practicable the interior surface of the climb chamber is of low heat absorptive capacity, and desirably is protected against transmission of radiant heat.

After the chamber is so chilled, it is opened and heated internally to sea level temperature, say to +70° F. The interior surface of the climb chamber is only superficially heated, but when the subjects of test are introduced, they encounter ground conditions. Upon closure of the chamber, refrigeration is resumed and evacuation of air starts. With chambers of considerable size, and refrigerative plants only moderately more than sufficient to maintain conditions, it is possible to "level off" at 40,000 foot conditions in ten or twelve minutes and the rate of change can be made to conform to flight rates.

It is important to observe that the refrigerative effect is not stored by the abstraction of latent heat. Storing of refrigeration by freezing liquids such as water or brine is not desirable for applicant's purpose, because it tends to distort the temperature-time curve at or near the melting point of the frozen liquid, by offering excessive heat absorptive capacity at that temperature and much lower absorptive capacity at other temperatures.

The apparatus can readily be equipped with all necessary controls and with observation windows, instrument locks, and recording and indicating instruments. To permit access during tests, an air lock with cooling surface to maintain a transition temperature is provided. The device can be used also for various special purposes such as study of the effects of exhaust and other gases at various temperatures and at various atmospheric pressures. While the device is primarily intended to study physiological effects, it can be used to establish the rapidly changing environment sometimes needed to test the performance of mechanical apparatus, notably carburetors, superchargers, indicating and recording devices, etc., etc.

In the best embodiment of the apparatus, the climb chamber is a thermally insulated enclosure mounted within and spaced from a thermally insulated pressure resisting shell. Where first cost is controlling, the expense of constructing an enclosure within a shell can be avoided, as will be hereinafter explained, but at some sacrifice of rapidity or economy of operation or both.

In the drawings are illustrated two practicable embodiments of apparatus for carrying out the invention.

Figure 1:
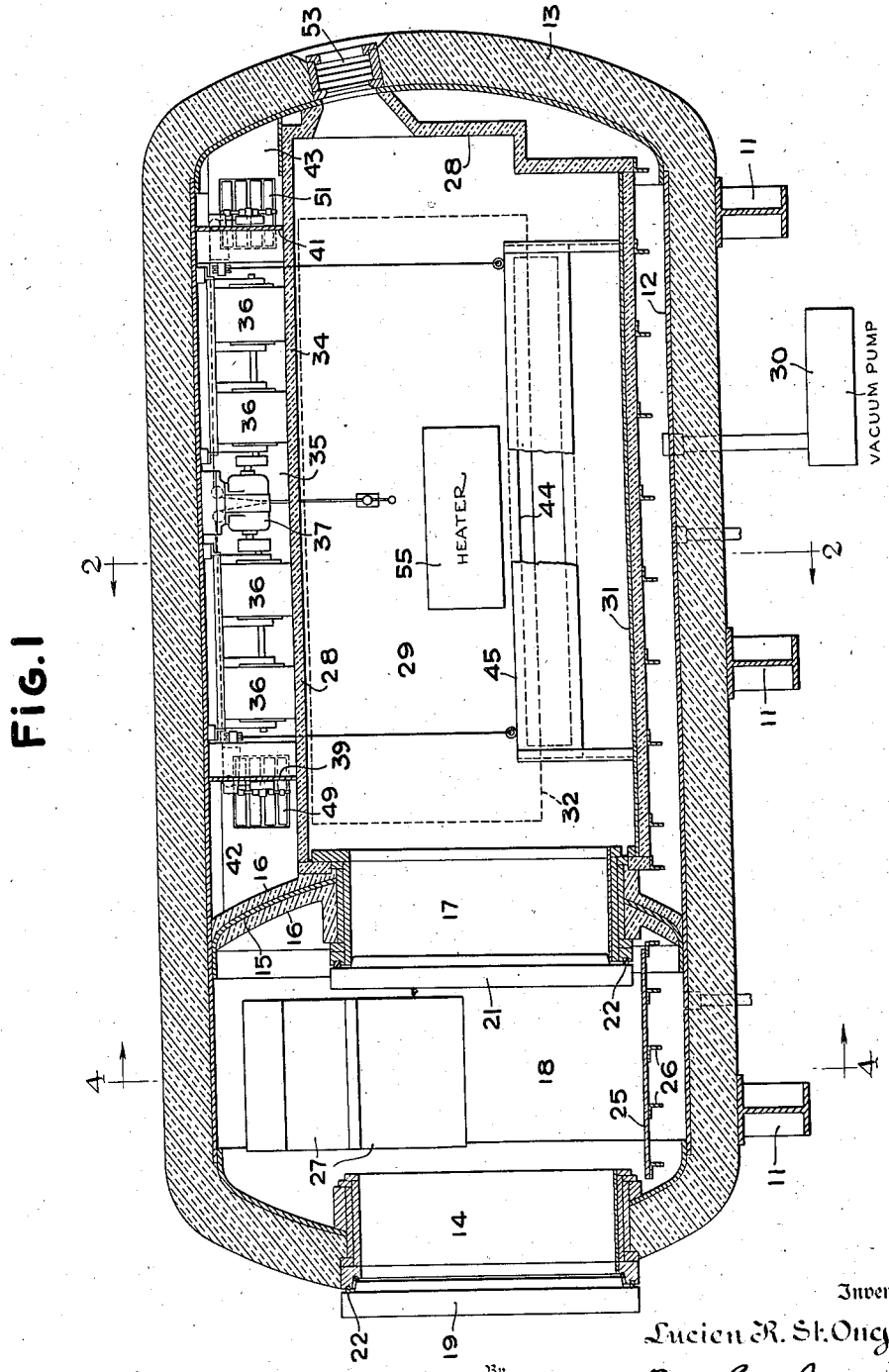
Fig. 1 is a vertical axial section of the shell and chamber. In this view the evaporator is shown, but the refrigerant connections as well as the compressor and condenser which are external to the shell are not shown.

Refer first to Figs. 1 to 4.

A series of cradle-like bases 11 support the shell 12 which is surrounded by thermal insulation 13. This insulation may be of any suitable material and must be of such thickness as to prevent serious heat leakage under the temperature differentials which are contemplated.

The shell 12 is closed at one end (the right hand end as viewed in Fig. 1) and is provided with an access opening surrounded by a door frame 14 at the other end. Somewhat less than a third of the distance from this door to the closed end there is an intermediate pressure resisting partition 15 which is provided with thermal insulation on both sides as indicated at 16 and which is provided with a doorway surrounded by a door frame 17. The space within the shell between the door frames 14 and 17 serves as an airlock 18.

Sealing with respective door frames 14 and 17 are insulated doors 19 and 21. These doors seal on gaskets which are indicated at 22 and the doors are so arranged that they seat toward the zone of lower pressure. Thus since the particular chamber illustrated is intended for use at subatmospheric pressures, the doors 19 and 21 are mounted on the outer sides of their respective frames 14 and 17. They are mounted on hinges such as the hinges 23 illustrated as applied to the door 21 in Fig. 4. Only an impositive latch is needed for each door because as soon as the pressure differential is created, the effect will be to hold the door in sealing engagement with its frame, the seal being produced by the door gasket 22 in each case.

In order to permit opening of the doors 19 and 21, a valved pressure equalizing unit 24 (Fig. 3) is provided. It can be operated to connect the airlock 18 with atmosphere or with the climb or to disconnect it from both.

In the airlock 18 there is a floor 25 which is sustained on the cross bars 26 and these cross bars are sustained at their ends by the shell 12. A series of cooling coils 27 are mounted in the airlock 18 and may be operated to maintain the airlock at a temperature intermediate the normal temperature external to the shell 12 and the low temperatures developed during tests in the climb chamber. The exchangers 27 are conventionally indicated, and no attempt is made to illustrate the piping connections which obviously must pass through the shell 12 and form part of the main or any suitable refrigerating circuit, the compressor and condenser portions of which are all external to the shell 12.

Mounted in the shell 12 and sealed to the door frame 17 is an insulating shell 28 which encloses the climb chamber and which is spaced from the shell 12 at all points except where certain instrument locks and observation windows are mounted, as will be explained.

The walls of the climb chamber 28 may be constructed of any suitable material. "Ferrotherm" has been successfully used. "Ferrotherm" is the trade name for a laminated thermal insulating material comprising specially surfaced metallic sheets which develop high resistance to the passage of radiant heat. This material is preferred because of that characteristic. The shell 28 should not be hermetically closed, and in fact is provided with two large dampers which do not seal hermetically and cannot readily be made to do so. The intent is to secure effective heat insulation without imposing such tight closure as would permit the development of a substantial pressure differential between the climb chamber within the shell 28 and the so-called interspace between the shell 28 and the external pressure resisting shell 12, from which the suction pump 30 draws air to reduce the air pressure.

Figure 2:
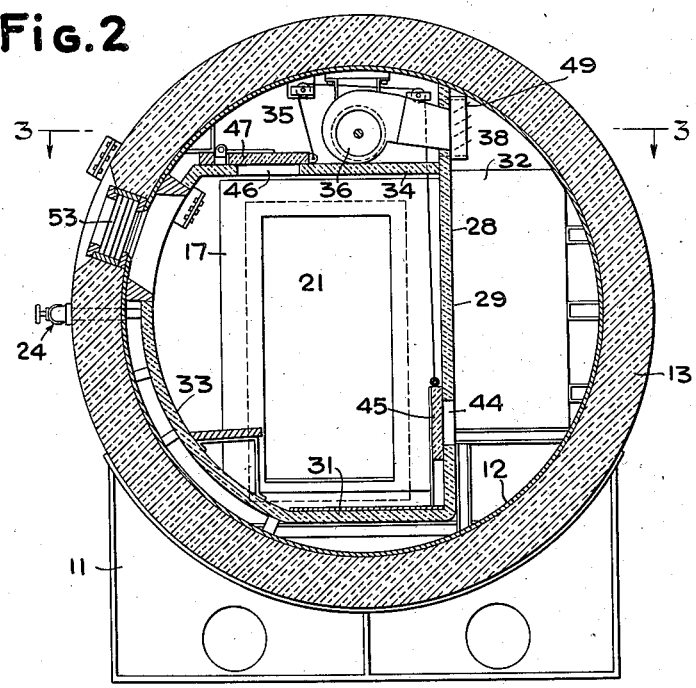
Fig. 2 is a vertical transverse section on the line 2—2 of Fig. 1.

The vertical transverse section of the climb chamber within the shell 28 is best shown in Fig. 2. There is a vertical wall 29 which is secant to the cylindrical shell and which extends from the floor 31 of the climb chamber to the pressure resisting shell 12 near the top thereof, the floor being insulated as indicated. The space to the right of the vertical wall 29, as viewed in Fig. 2, contains the low temperature finned tube evaporators which are conventionally indicated at 32 in Fig. 2. These are necessarily low temperature units and any connections suited to low temperature work may be availed of. The connections are not illustrated.

The floor 31 is spaced at all points above the bottom of the shell 12 and the intervening space communicates with the narrow passage between the arcuate side wall 33 of the climb chamber and the shell 12. The ceiling 34 extends from the arcuate portion 33 to the vertical wall 29 and defines a fan suction chamber 35 in which is mounted a battery of four centrifugal fans 36, all driven by a single electric motor 37. These fans have snail-shell housings so that they draw air from the chamber 35 and discharge it through ports in the upper portion of the partition 29. Consequently they discharge into a plenum 38 immediately above the finned evaporator 32. The fan suction chamber 35 is defined at its ends by two partitions 39 and 41 so that by-pass passages 42 and 43 are afforded past the two ends of the suction chamber 35. The "interspace" in which refrigerative effect is stored comprises the entire interval between the inner shell 28 and the outer shell 12.

There is a long air port 44 between the interior of the climb chamber and the interspace at a point near the bottom of the evaporator 32. This port 44 is controlled by a damper 45. There is a similar elongated port 46 leading from the climb chamber through the ceiling 34 into the fan suction chamber 35. This is controlled by a damper 47. The damper 47 is hinged, as shown, while the damper 45 slides in vertical guides. The dampers are connected to open and close together by any known means and connections (not shown) may be provided to operate them from the exterior of the shell.

Figure 3:
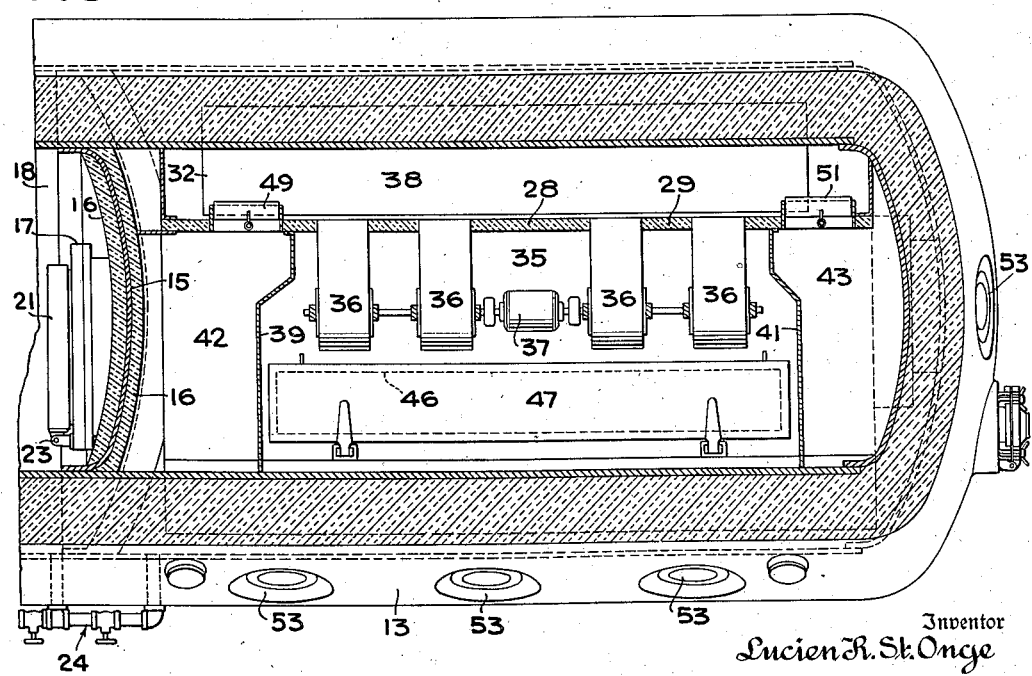
Fig. 3 is a horizontal section on the line 3—3 of Fig. 2.
Figure 4:
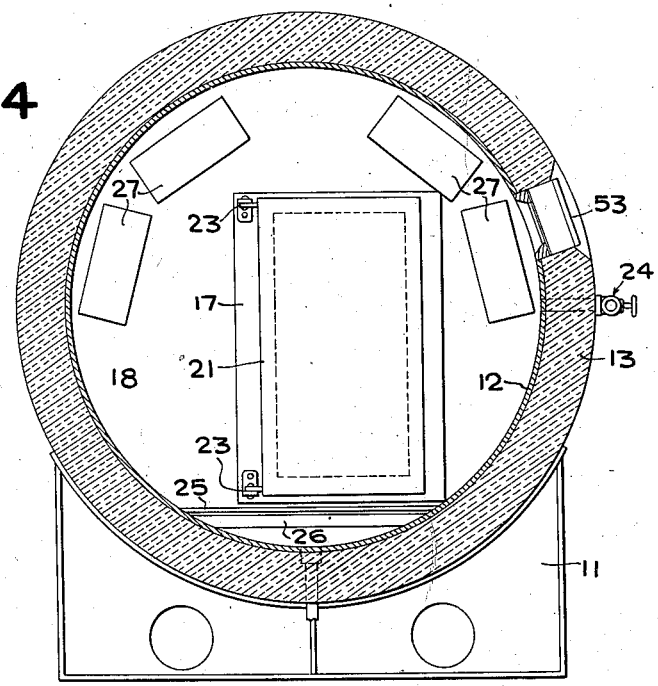
Fig. 4 is a vertical transverse section on the line 4—4 of Fig. 1.

Mounted in the wall 29 and offering communication between the by-pass passages 42 and 43 on the one hand, and the plenum space 38 on the other, are by-pass dampers 49 and 51. These are manually adjustable by any suitable means from the exterior of shell 12. There are four observation windows, generally indicated by the numeral 53. Their location is best shown in Fig. 3 and one of them appears in section in Fig. 2. Each window is made up of a series of spaced panes of transparent material of such diameter and thickness as to withstand the pressure differentials created during the operation of the device. Three of these windows are arranged along the side of the shell and the fourth appears at the right hand end of the device, as shown in Figs. 1 and 3.

The windows are associated with offsets in the walls of the climb chamber so that the windows permit observation of the interior of the climb chamber. The connections to the internal shell do not seriously obstruct air flow between the climb chamber shell and the main pressure resisting shell 12.

It will be understood that the main refrigerative evaporator 32 forms a part of a mechanical refrigerating circuit, the compressor, condenser and receiver portions of which are external to the shell 12 and are not shown in the drawing. The refrigerative circuit involves no patentable novelty in and of itself. It is of any low temperature type.

Because of the low suction pressure necessarily used in the evaporator 32, it has been found expedient to resort to mechanical circulation of the refrigerant liquid in the evaporator 32.

The purpose of this circulation is to assure that all parts of the evaporator are effective at all times, and to avoid penalty upon any part of the evaporator imposed by the static head of liquid refrigerant. The need for this circulation and the means to produce it are well understood in the low temperature refrigeration art.

*Operation—device as shown in Figs. 1–4*

The initial phase is conditioning the device by a long temperature pull-down. With the dampers 45 and 47 open, the evaporator 32 is operated at low temperature until the entire shell and structure is cooled to say 100° F. below zero. The fans 36 need not be operated. The evaporators 27 may or may not be operated in the first stage of this pull-down but they can desirably be used to assist in the general refrigerative effect.

The conditioning phase is not completed until the shell 12, most of insulation 13, and all internal parts including the shell 28 of the climb chamber have given up heat and leveled off at the desired minimum temperature (assumed to be —100° F.). It is obviously desirable that insulation 13 be external to shell 12 since the shell has good heat absorptive capacity.

The interior of climb chamber 28 is then warmed up by any suitable means such as heater 55, which is operated only long enough to heat the air in and the internal surface of climb chamber to a shallow depth. During this phase, the dampers 45, 47 are closed, the by-pass dampers 49, 51 are open, and the evaporator 32 preferably continues in operation. Fans 36 are not then in operation. Heater 55 is preferably a portable electric heater, so that it can be removed just prior to the introduction of the test subject or subjects. This saves space, but if a heater is desired to soften the transition to ground conditions, or for use in simulating descent or dive conditions, the heater may be left in place, or it may be permanently installed as was done in at least one prior art strato-chamber.

The subjects then enter, the doors 19 and 21 being closed behind them. Dampers 45 and 47 are opened, pump 30 is started and climb conditions are initiated. The rates of operation of the pump 30 and of the fans 36 and the settings of by-pass dampers 49 and 51 are so controlled as to give the desired rates of depression of temperature and pressure to simulate the chosen rate of climb.

*General considerations*

To avoid complicating the disclosure, indicating and recording instruments are not shown nor are all the details of control mechanisms elaborated. They are not features of invention and their specific form will depend on preferences of the user. The sensitive elements of indicating and recording instruments will usually be within the climb chamber or at other appropriate points within shell 12 and the remainder of the mechanism will be outside the shell 12 and preferably centered at a control board where also the damper, evaporator and motor controls would be located.

The embodiment illustrated is expensive because of the insulated chamber 28 enclosed in and spaced from the pressure resisting shell 12.

Where economy of operation, or very rapid rates of change of temperature are not controlling considerations, recourse may be had to two chambers, neither of which encloses the other. These two chambers could be distinct structurally and located in various relative positions, but the simplest and most economical structure comprises two chambers formed by subdividing a single cylindrical shell. Such an arrangement is indicated in Fig. 5.

Figure 5:
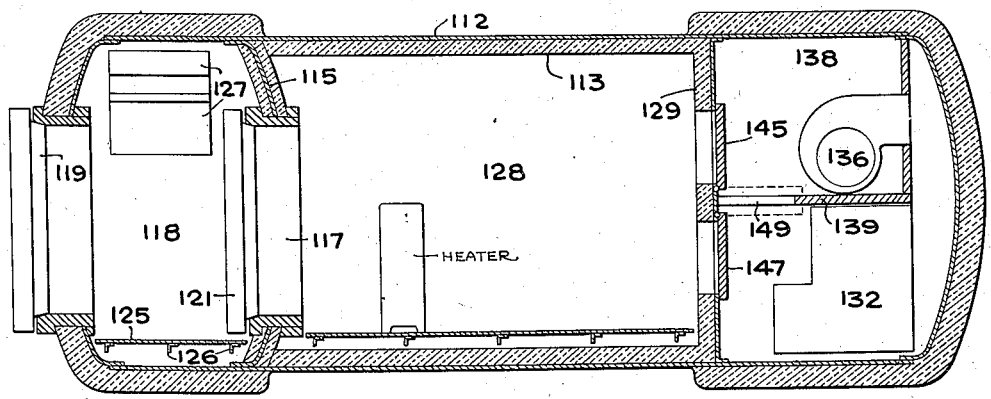
Fig. 5 is a view similar to Fig. 1, showing a modification.

*Embodiment of Fig. 5*

In Fig. 5, a shell 112 encloses a climb chamber 128, an airlock 118 with doors 119 and 121, and an evaporator chamber 138. The first two chambers are separated by a pressure resisting partition 115 in which the frame 117 for door 121 is mounted.

The airlock 118 is essentially identical in all respects with that shown in Figs. 1–4. The climb chamber occupies the entire cross section of shell 112. As shown all the insulation 113 is inside the shell throughout the length of the climb chamber. The purpose is to limit heat penetration during the warm-up period.

The climb chamber 128 is separated from the evaporator chamber 138 by a heat insulating partition 129 which need not resist any substantial pressure. Dampers 145 and 147 control air circulation ports in this partition and when open serve to close a by-pass 149 through partition 138. The evaporator appears at 132 and the circulating fan at 136.

In one position of dampers 145 and 147, the fan 136 circulates through the evaporator 132 and evaporator chamber 138 by way of by-pass 149. In the other position of the dampers, circulation is through the climb chamber 128.

With the structure of Fig. 5, observation ports, instrument locks and various indicators and controls can be applied with the same facility as in the other embodiment. Illustration is deemed unnecessary, so far as these accessories are concerned.

The mode of use is the same, the operation is the same, and the result produced is substantially the same, but the exposed surface for assisting rapid pre-cooling is smaller.

*Summary*

The basic inventive concept is the method of first establishing a uniform temperature condition which is more severe than the maximum altitude condition to be simulated, then locally heating the climb chamber to simulate ground conditions (such heating imparting only a minor amount of heat to the walls of the chamber), and thereafter absorbing this relatively small input of heat to secure a rapid development of high altitude temperature conditions.

In what has just been said, emphasis has been put on temperature, but it is of course contemplated that simultaneously with the reduction of temperature, an appropriate reduction of pressure will be brought about.

The apparatus is a concept secondary to the method, and can take various forms. The necessary apparatus includes a climb chamber, a pressure-resisting shell, some refrigerating means operable to chill the climb chamber and the whole apparatus, heating means used briefly to warm only the air content and the internal surface of the climb chamber, and some means for reducing air pressure in the climb chamber. Both of the described embodiments have these features.

It is highly desirable that at least the internal surface of the climb chamber be insulated thermally. That feature is present in the structure of Figs. 1 to 4 and obviously can be embodied in the insulation 113 surrounding chamber 128 in Fig. 5.

The details of arrangement of the apparatus are subject to wide variation, for example, both the embodiments show a single cylindrical pressure resisting shell. As a rule it will be found satisfactory as to space occupied and better as to cost of manufacture to adopt this arrangement. If particular local conditions impose special dimensional limitations, it is practicable to locate chambers side-by-side instead of end-to-end as in Fig. 5, or to locate one above the other.

In the design of the chambers, account must be taken of the fact that the reduction of pressure necessary to simulate high altitude conditions requires a shell capable of withstanding external pressures nearly equal to one atmosphere. This makes the use of rectangular chambers expensive though it is technically possible.

The two embodiments chosen for illustration are illustrative and not limiting, the scope of the invention being defined exclusively by the claims.

I claim:

1. The method of approximating temperature changes encountered in rapid climbs to high altitudes, which comprises providing a refrigerating structure of substantial thermal capacity enclosing a thermally insulated chamber; refrigerating the structure until it attains a temperature somewhat lower than the temperature characteristic of the assumed maximum altitude; then warming the air in, and the internal surface of, the chamber to establish temporarily temperature conditions at ground level; terminating such warming; and thereafter causing a rapid reduction of chamber temperature effected at least in part by refrigerative effect stored in the structure.

2. The method of simulating conditions encountered in rapid climbs to high altitudes, which comprises providing a refrigerating structure of substantial thermal capacity enclosing a thermally insulated chamber protected against external pressure; refrigerating the structure until it reaches a temperature substantially lower than that encountered at the simulated maximum altitude; briefly warming the air in, and the internal surface of, the chamber to establish temporary conditions characteristic of ground level; suspending heating; and thereafter reducing the temperature and pressure in the chamber at rates appropriate to the simulated rate of climb, the reduction of temperature being effected at least in part by refrigerative effect stored in the refrigerating structure.

3. The method of simulating conditions encountered in rapid climbs from low to high altitudes which comprises, providing a chamber and heat storage means of large capacity external thereto; protecting said chamber and storage means from inflow of heat and refrigerating at least the storage means until substantially all parts thereof reach a temperature materially lower than that characteristic of the maximum simulated altitude; protecting the storage means and the major portions of the chamber walls against accessions of heat while warming the interior of the chamber and the inner surface of its walls sufficiently to establish low altitude temperature conditions within the chamber; terminating heating; and thereupon placing the chamber and storage means in thermal communication.

4. The method of simulating conditions encountered in rapid climbs from low to high altitudes which comprises, providing a chamber and heat storage means of large capacity external thereto; protecting said chamber and storage means from inflow of heat and refrigerating at least the storage means until substantially all parts thereof reach a temperature materially lower than that characteristic of the maximum simulated altitude; protecting the storage means and the major portions of the chamber walls against accessions of heat while warming the interior of the chamber and the inner surface of its walls sufficiently to establish low altitude temperature conditions within the chamber; terminating heating; and thereupon placing the chamber and storage means in thermal communication and reducing atmosphere pressure in the chamber at such rates that pressure and temperature will vary together and attain approximately simultaneously the values corresponding to the assumed maximum altitude.

5. The method of simulating in a chamber rapid changes of temperature and pressure encountered in rapid climbs from low to high altitudes, which comprises providing a thermally isolatable climb chamber and heat storage means of large capacity external thereto; refrigerating said chamber and storage means while in thermal communication with each other to a temperature substantially lower than that characteristic of the assumed maximum altitude; conserving refrigeration stored in the storage means while thermally isolating and warming the interior of the chamber and the interior surfaces of its walls to establish therein low altitude temperature conditions; terminating heating; thereafter placing the chamber and storage means in thermal communication and refrigerating to reduce chamber temperature at a rapid rate caused at least in part by temperature equalization between the chamber and storage means; and simultaneously with said accelerated temperature reduction, reducing pressure in the chamber.

6. The method of simulating in a chamber rapid changes of temperature encountered in rapid climbs from low to high altitude, which comprises providing a chamber having walls of low heat absorptive capacity, the chamber being capable alternatively of being put into thermal communication, or isolated from a surrounding storage means of large heat absorptive capacity; refrigerating said storage means and chamber while in thermal communication with one another to a temperature substantially lower than that characteristic of the assumed maximum altitude; thermally isolating the chamber from said storage means, and while continuing refrigeration of the storage means, warming the interior of the chamber and the interior surface of its enclosing walls to establish therein low altitude temperature conditions; terminating heating; and thereafter placing the chamber and storage means in thermal communication and continuing refrigeration to reduce chamber temperature at a rapid rate caused at least in part by temperature equalization between the chamber and the storage means.

7. In a device of the class described, the combination of a thermally insulated enclosure of low heat absorptive capacity; a thermally insulated enclosure of high internal heat absorptive capacity; refrigerating means operable to abstract heat from the second named enclosure and thereby store refrigerative effect therein; means operable to transfer heat rapidly from the first to the second enclosure and alternatively to isolate said enclosures thermally from one another; and means operable to heat the interior of the first named enclosure.

8. In a device of the class described, the combination of a thermally insulated enclosure of low heat absorptive capacity; a thermally insulated enclosure of high internal heat absorptive capacity; refrigerating means operable to abstract heat from the second named enclosure and thereby store refrigerative effect therein; means operable to transfer heat rapidly from the first to the second enclosure and alternatively to isolate said enclosures thermally from one another; means operable to heat the interior of the first named enclosure; a pressure resisting shell forming part of at least the first named enclosure; and means for reducing the pressure in said shell below atmospheric pressure.

9. The combination of a climb chamber having thermally insulated walls and including an internal shell of low heat absorptive capacity; a refrigerative chamber with low temperature refrigerative surface; fan means for circulating air in contact with said refrigerative surface; means for directing the resulting air flow alternatively in a path through the climb chamber and a path by-passing said chamber; and temporarily operable means for warming the air in said climb chamber and the internal surface of the chamber.

10. The combination of a thermally insulated pressure resisting shell; a refrigerative chamber in said shell having low temperature refrigerative surface; an insulated climb chamber also in said shell and formed by enclosing walls spaced from the walls of said shell, the internal surface of said climb chamber having low heat absorptive capacity; fan means for circulating air in contact with said refrigerative surface; means for directing said circulated air selectively in a path at least partially through said climb chamber, and in a path around said chamber; and heating means operable temporarily to heat the air in, and the internal surface of, said climb chamber.

11. The combination of a climb chamber having thermally insulated walls and including an internal lining of low heat absorptive capacity; an air lock for affording access to said climb chamber through said shell; a refrigerative chamber with low temperature refrigerative surface; fan means for circulating air in contact with said refrigerative surface; means for directing the resulting air flow altenatively in a path through the climb chamber and a path by-passing said chamber; and temporarily operable means for warming the air in said climb chamber and the internal lining of the chamber.

12. The combination of a thermally insulated pressure resisting shell; a refrigerative chamber in said shell having low temperature refrigerative surface; an insulated climb chamber also in said shell and formed by enclosing walls spaced from the walls of said shell, the internal surface of said climb chamber having low heat absorptive capacity; an air lock for affording access to said climb chamber, through the walls of said pressure-resisting shell; fan means for circulating air in contact with said refrigerative surface; means for directing said circulated air selectively in a path at least partially through the climb chamber, and in a path around said chamber; and heating means operable temporarily to heat the air in, and the internal surface of, the climb chamber.

13. In a device of the class described, the combination of a thermally insulated shell; refrigerating means enclosed thereby and operable to develop and store refrigerative effect; a thermally insulated climb chamber; fan means for circulating air in contact with said refrigerating means; and means operable to connect the climb chamber in a flow circuit which includes said fan means and refrigerating means and alternatively substantially to isolate said chamber from such circuit.

14. In a device of the class described, the combination of a thermally insulated shell; refrigerating means enclosed thereby and operable to develop and store refrigerative effect; a thermally insulated climb chamber; fan means for circulating air in contact with said refrigerating means; means operable to connect said climb chamber in a flow circuit which includes said fan means and refrigerating means and alternatively substantially to isolate said chamber from such circuit; and means for reducing the air pressure in said climb chamber.

15. In a device of the class described, the combination of a thermally insulated shell; rerfrigerating means enclosed thereby and operable to develop and store refrigerative effect; a thermally insulated climb chamber; fan means for circulating air in contact with said refrigerating means; means operable to connect the climb chamber in a flow circuit which includes said fan means and refrigerating means and alternatively substantially to isolate said chamber from such circuit; means for heating the interior of the climb chamber when so isolated; and means for reducing the air pressure in the climb chamber.

16. The combination defined in claim 13 in which the climb chamber is mounted in said insulated shell with an interspace which substantially surrounds the climb chamber, and the refrigerating means is mounted in the interspace.

17. The combination defined in claim 14 in which the insulated climb chamber is mounted within said insulated shell and spaced therefrom and the refrigerating means is mounted in the space between the climb chamber and the shell, and in which the pressure in the climb chamber is controlled by varying the pressure in the shell.

18. The combination of a thermally insulated shell; a thermally insulated climb chamber mounted within said shell and spaced therefrom so as to afford an interspace which substantially surrounds said chamber; refrigerating means in a portion of the interspace, the last-named refrigerating means being capable of storing a substantial refrigerative effect; fan means for circulating air in contact with the refrigerating means; dampers operable to connect the climb chamber in a circuit which includes the fan means and the refrigerative means, and alternatively substantially to isolate said chamber; and independently adjustable by-pass damper means controlling a by-pass flow around the fan means through the interspace.

19. The combination of a thermally insulated shell; a thermally insulated climb chamber mounted within said shell and spaced therefrom so as to afford an interspace which substantially surrounds said chamber, an air lock having access doors, one between the air lock and the external atmosphere and the other between the air lock and the climb chamber; refrigerating means in the air lock; refrigerating means in a portion of the interspace, the second-named refrigerating means being capable of storing a substantial refrigerative effect; fan means for circulating air in contact with the second-named refrigerating means; and means operable to connect the climb chamber in a circuit which includes the fan means and the second named refrigerative means, and alternatively substantially to isolate said chamber.

20. The combination of a thermally insulated shell; a thermally insulated climb chamber mounted within said shell and spaced therefrom so as to afford an interspace which substantially surrounds said chamber; an air lock having access doors, one between the air lock and the external atmosphere and the other between the air lock and the climb chamber; refrigerating means in a portion of the interspace, capable of storing a substantial refrigerative effect; fan means for circulating air in contact with the refrigerating means; means operable to connect the climb chamber in a circuit which includes the fan means and the refrigerative means, and alternatively substantially to isolate said chamber; and independently adjustable by-pass damper means controlling a by-pass flow around the fan means through the interspace.

21. A method of producing rapid reductions of temperature from temperatures characteristic of ground levels to temperatures characteristic of the sub-stratosphere, which comprises enclosing a chamber by insulation having a high resistance to the transmission of heat and a low heat absorptive capacity; associating with said chamber, externally thereto, heat storage means of large capacity; protecting said storage means from accessions of heat and withdrawing heat substantially continuously from said storage means and the walls of said chamber at a moderate rate and to a minimum temperature lower than that characteristic of the sub-stratosphere; warming the interior of said chamber while out of thermal communication with said heat storage means to establish temporarily, within the chamber, temperature conditions approximating ground level temperature; terminating said heating; and thereupon placing the interior of said chamber in good thermal communication with said heat storage means.

LUCIEN R. ST. ONGE.